Aug. 19, 1958     E. A. FABISH     2,848,332
METHOD OF BROWNING FLOUR
Filed May 1, 1953
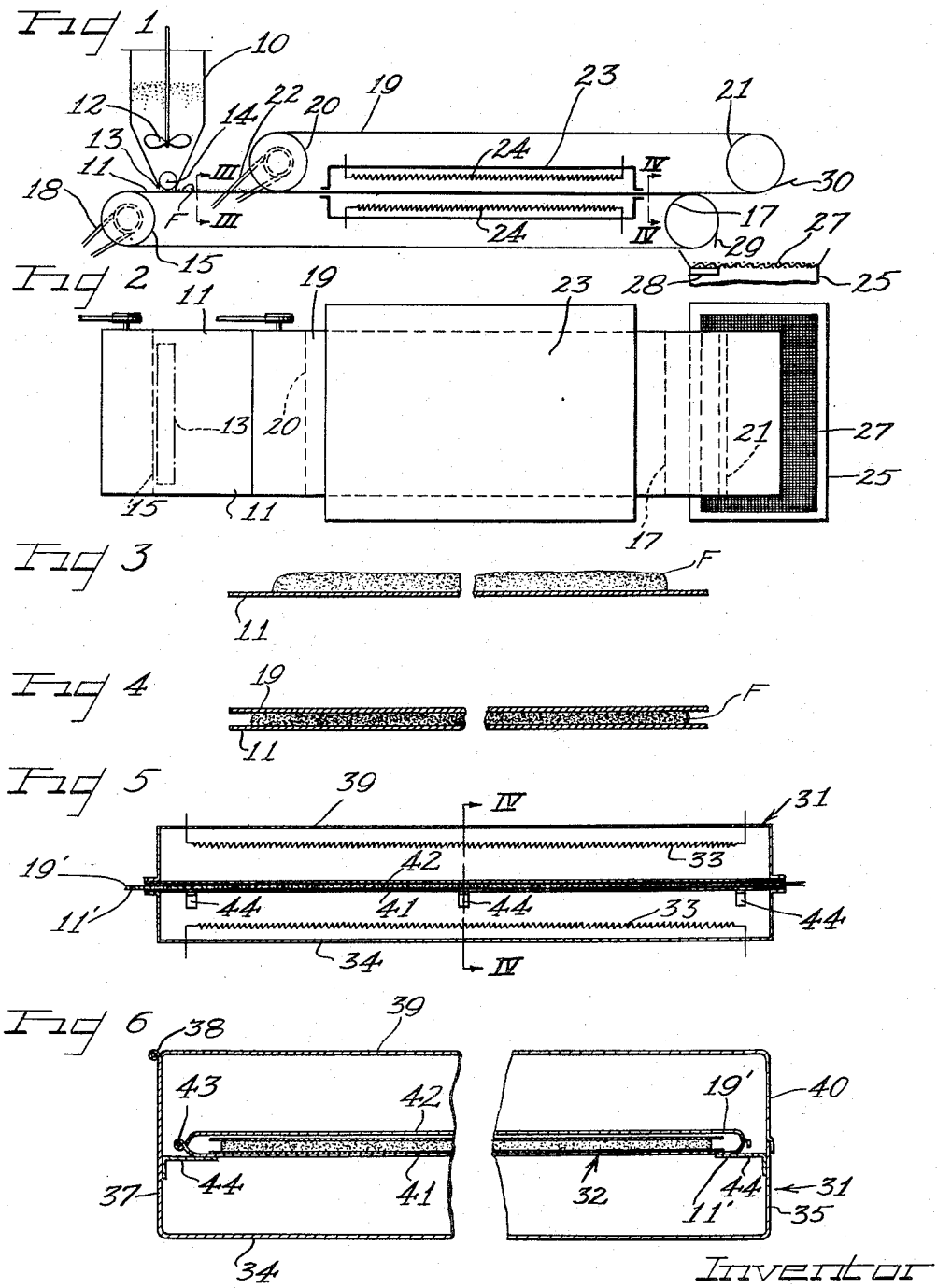
Inventor
Edward A. Fabish

United States Patent Office 2,848,332
Patented Aug. 19, 1958

2,848,332

METHOD OF BROWNING FLOUR

Edward A. Fabish, McHenry, Ill.

Application May 1, 1953, Serial No. 352,409

1 Claim. (Cl. 99—93)

The present invention relates to the production of uniformly browned flour on a commercial scale.

Many cooks and chefs use rye or wheat flour as a thickening agent in making sauces, gravies and soups. For most purposes flour that has been heat browned imparts not only a better flavor but also improved coloration to the food product. On a small kitchen scale the flour is conventionally browned by cooking it in hot edible fat. Such preparation of the flour is, however, quite time consuming and ordinarily requires the use of a utensil in addition to the utensils already being used in the preparation of the food.

The principal aim of the present invention is to provide cereal flour in uniformly browned, roasted condition in commercial quantities so that it can be supplied at moderate cost in dry flour condition for direct use as a thickening and flavoring agent in the preparation of food products.

Another object of the invention is to provide a novel method of making uniformly browned flour.

A further object of the invention is to provide novel means for the commercial production of uniformly browned flour.

Other objects, features and advantages of the present invention will be readily apparent from the following detailed description of certain preferred embodiments thereof taken in conjunction with the accompanying drawing in which:

Figure 1 is a schematic side view of an apparatus according to the present invention for making browned flour;

Figure 2 is a schematic top plan view of the apparatus;

Figure 3 is an enlarged fragmental sectional view taken substantially on the line III—III of Figure 1;

Figure 4 is an enlarged fragmental sectional view taken substantially on the line IV—IV of Figure 1;

Figure 5 is a more or less schematic longitudinal sectional detail view through a modified form of the apparatus; and Figure 6 is an enlarged fragmental transverse sectional detail view taken substantially on the line VI—VI of Figure 5.

The method of the present invention will be readily understood from the following detailed description of certain preferred apparatus for practicing the method.

Having particular reference to Figures 1 through 4, a preferred flour such as wheat or rye flour is supplied from a suitable source such as a hopper 10 to an endless sheet metal belt 11. To prevent clogging or arching of the flour in the hopper 10 a suitable agitator 12 is preferably operated within the hopper. To assure uniform distribution of the flour from the hopper onto the belt 11, the hopper is provided with a narrow discharge funnel opening 13 elongated transversely of the belt 11 and extending short of the opposite sides of the belt, and a suitable rotary or other distributor 14 operative at the discharge port properly meters the flour from the hopper.

The metal belt 11 is trained over spaced parallel, horizontal axis rolls 15 and 17 one of which, such as the roll 15 is preferably driven by belt or chain drive means 18 or the like while the opposite roll 17 may be an idler roll. The flour from the hopper 10 is deposited on the upper run of the belt 11 adjacent the starting end of the upper run of the belt, as for example adjacent to where the belt comes up over the roll 15. By having the hopper nozzle 13 disposed to supply a layer of substantially predetermined thickness of the flour to a width substantially inside the opposite side margins of the belt 11, as visualized in Figures 2 and 3, assurance is had that the flour will not flow over the sides of the belt.

Dry flour has the property of substantially compacting under compression, and the present method takes this into account in determining as to the initial depth of the layer of flour, identified at F in Figure 3. For example, the initial layer F of flour may be approximately ⅜″ thick. This layer is then compressed to about two-thirds of its original thickness to say about ¼″, thereby attaining a desirable density for subsequent steps in the process. Herein such densification is effected by uniform pressure applied by a superimposed metal belt 19 (Figures 1, 2 and 4), preferably of approximately the same width as the carrying belt 11 and of the same material and gauge.

Mounting and operation of the pressure belt 19 is preferably similar to that of the carrying or conveyor belt 11. To this end, the belt 19 is preferably of endless construction, trained over a pair of rolls 20 and 21, one of which such as the roll 20 being a driven roll. Motivation for the roll 20 is afforded by appropriate drive means including a drive belt or chain 22 synchronized in operation with the drive means for the driving roll 15 for the conveyor belt. The pressure belt roll 20 is mounted in offset relation to the conveyor belt roll 15 in a direction of conveyor travel a sufficient distance to accommodate the flour supply bin or hopper 10. At the opposite or discharge ends of the belts, the compression belt roll 21 is preferably offset beyond the conveyor belt roll 17 a distance sufficient to assure clean discharge and wiping of the belts at the end of the flour treating run of the belts.

A predetermined adjusted spaced relation between the opposing runs of the belts 11 and 19 is maintained to keep the layer of compressed flour F under constant pressure and with the respective belts in uniform intimate contact with the opposite faces of the flour layer F. As best seen in Figure 4, under the compression, the flour layer F while reducing substantially in thickness from the deposited thickness thereof as indicated in Figure 3, spreads laterally only slightly between the belts, and sufficient allowance is made for such spread so that the flour will not spread beyond the edges of the belts and drop off of the conveyor belt 11.

As the flour layer F is transported under compression between the conveyor and pressure belts 11 and 19, it is subjected to uniform dry heat of sufficient intensity and duration to roast each particle of the flour to a uniform degree of brownness. For example, uniformly medium brown flour is obtained by the present method where the flour is subjected to a temperature of approximately 600° F. to 800° F. for approximately 8 to 10 minutes of dry, preferably radiant heat. It will be appreciated, of course, that controlled color variations from light brown to dark brown can be obtained by appropriate adjustments in temperature, duration of subjection to the temperature, or both.

In a practical manner of effecting the roasting of the flour, the operative conveyor-compression runs of the belts 11 and 19 with the compressed layer of flour therebetween passes through a browning or roasting oven 23 within which the flour is subjected to radiant or induction heaters or elements 24, although appropriate banks of infra red lamps may be used if preferred. By having the metal belts 11 and 19 of a relatively high heat transfer type of material such as a copper alloy or other dark metal alloy thorough penetration of the dry, radiant or induction heat to the flour particles in the compressed layer F is attained, and advantage gained also from contact heating that may result from heating of the belts 11 and 19 while passing through the oven. Further advantage can be obtained by having at least the inside of the oven walls of polished bright metal such as stainless steel so as to improve efficiency by the reflective qualities of the polished surfaces directed toward the compressed layer of flour between the operative run of the belts. It will be observed that the walls of the oven 23 are preferably uniformly reasonably closely spaced about the enclosed operative run of the flour carrying belts.

Promptly after the roasting has been completed, the flour is discharged from between the belts 11 and 19 and drops or dumps off into a suitable receptacle 25, preferably through a screen 27. By reason of the compression of the flour, the particles tend to cling together and therefore as the flour drops down from the discharge ends of the belts, it may be in loosely adhering lumps most of which will break up completely upon striking the screen 27. Positive breakup of any lumps or flour masses that may come to rest on the screen 27, and also positive passage of all of the browned flour down through the screen 27 may be assured by equipping the screen with a suitable vibrator 28. Appropriate wipers or doctor blades 29 and 30 may be provided to assure clean return of the belts 11 and 19, respectively.

In the modification of Figures 5 and 6, a flour roasting oven 31 of slightly different construction may be provided. This oven provides a substantial chamber about the conveying and flour compressing runs of endless metal belts 11' and 19', similarly as is provided by the oven 23. However, horizontally centrally disposed within the chamber provided by the oven 31 is a secondary roasting chamber provided by a flat tubular closure or casing 32. This secondary chamber casing 32 is preferably made from a metal of high heat conductivity such as heavy gauge copper sheet. Thereby added efficiency may be attained from the heat developed by heating elements 33 in the oven chamber provided by the casing for the oven 31.

In order to enable ready access into the oven 31 for cleaning and other purposes, it is preferably made so that at least two parts may be opened for access into the interior. To this end, a lower pan-like oven member 34 of appropriate gauge sheet metal is provided with vertical side walls 35 and 37. The side wall 37 may rise substantially to the top limit of the oven 31 and has hingedly secured thereto as at 38 a cover portion 39 provided at its opposite margin with a depending flange 40 cooperatively related in closing relation to the upstanding side wall 35 of the lower oven member 34. Through this arrangement the cover portion 39 can be raised for access into the interior of the oven 31.

For enabling access into the interior of the secondary oven chamber tube 32, it is preferably constructed of similar lower and upper, separable tube portions 41 and 42, respectively, hingedly connected as at 43 along one margin and cooperatively separably related along the opposite longitudinal margin. Supporting brackets 44 are preferably provided at suitable intervals for supporting the lower member 41 upon respectively the side walls 35 and 37 of the main oven chamber casing member 34. Through this arrangement, when the oven cover 39 is opened, access can also be obtained to the interior of the secondary oven chamber tube 32 by swinging the upper of the members 42 upwardly about its hinge connection 43 to the lower member 41. The lower secondary oven member 41 also provides sag preventing support for the opposing runs of the belts 11' and 19' as they pass longitudinally through the oven.

It will be understood, of course, that any appropriate sag preventing support may be provided under the oven traversing run of the opposing portions of the belts 11 and 19 in the form of Figure 1.

By the present method each individual particle of flour is uniformly browned throughout the mass of flour roasted. Apparently compression of the flour mass eliminates air insulation therein and thus the dry roasting heat can penetrate uniformly through the mass and uniformly roast each particle.

It will be understood that modifications and variations may be effected without departing from the scope of the novel concepts of the present invention.

I claim as my invention:

In a method of uniformly browning flour, applying a substantially uniform approximately ⅜ inch layer of unroasted flour onto a heat conductive supporting surface, superimposing a heat conductive compressing surface upon the flour, between the surfaces placing the flour under compression to compact the layer of flour to about two-thirds of its original thickness, and subjecting the compacted layer of flour while maintaining it between said surfaces to roasting temperature uniformly throughout the layer of flour to effect a uniform browning of the particles of flour throughout the compacted layer.

References Cited in the file of this patent

UNITED STATES PATENTS

| Number | Name | Date |
|---|---|---|
| 136,305 | Chichester | Feb. 25, 1873 |
| 625,696 | Perky et al. | May 23, 1899 |
| 1,079,676 | Wallos | Nov. 25, 1913 |
| 1,136,501 | Andrews | Apr. 20, 1915 |
| 1,517,271 | Woodson | Dec. 2, 1924 |
| 1,650,308 | Wallos | Nov. 22, 1927 |
| 1,732,262 | Dumbleton | Oct. 22, 1929 |
| 2,032,272 | Feltman | Feb. 25, 1936 |
| 2,069,589 | Meijling et al. | Feb. 2, 1937 |
| 2,504,110 | Davis et al. | Apr. 18, 1950 |
| 2,593,326 | McAskill | Apr. 15, 1952 |
| 2,590,757 | Cornelius et al. | May 25, 1952 |

FOREIGN PATENTS

| Number | Country | Date |
|---|---|---|
| 12,888 of 1913 | Great Britain | Apr. 2, 1914 |
| 58,375 | Norway | Sept. 6, 1937 |
| 110,523 | Sweden | May 2, 1944 |